(12) United States Patent  (10) Patent No.: US 8,077,175 B2
Anthony et al.  (45) Date of Patent: Dec. 13, 2011

(54) PHOTO MANTEL VIEW AND ANIMATION

(75) Inventors: Colin R. Anthony, Bothell, WA (US); Justin Mann, Kirkland, WA (US); Martijn E. Van Tilburg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/014,853

(22) Filed: Jan. 27, 2011

(65) Prior Publication Data

US 2011/0122129 A1  May 26, 2011

Related U.S. Application Data

(63) Continuation of application No. 12/637,067, filed on Dec. 14, 2009, now Pat. No. 7,903,110, which is a continuation of application No. 11/223,751, filed on Sep. 9, 2005, now Pat. No. 7,636,089.

(51) Int. Cl.
*G06T 15/00* (2011.01)

(52) U.S. Cl. ........ 345/419; 345/609; 345/631; 345/651; 345/660

(58) Field of Classification Search .................. 345/419, 345/631, 632, 609, 611, 639, 651, 660, 662, 345/677
See application file for complete search history.

(56) References Cited

U.S. PATENT DOCUMENTS

| 6,765,569 | B2 * | 7/2004 | Neumann et al. ............. 345/419 |
| 7,199,793 | B2 * | 4/2007 | Oh et al. ........................ 345/419 |
| 7,327,374 | B2 * | 2/2008 | Oh et al. ........................ 345/611 |
| 7,583,275 | B2 * | 9/2009 | Neumann et al. ............. 345/633 |

* cited by examiner

*Primary Examiner* — Phu Nguyen
(74) *Attorney, Agent, or Firm* — Shook, Hardy & Bacon LLP

(57) ABSTRACT

A system and computer-implemented method for rendering images on a two-dimensional display, such as a computer, handheld device, or television screen, so that the images appear to be positioned in a three-dimensional space is disclosed. The images may be graphics files or standard files with an associated thumbnail image. Numerous layouts of the images on the display are disclosed.

20 Claims, 6 Drawing Sheets

PHOTO MANTEL VIEW AND ANIMATION

CROSS-REFERENCE TO RELATED APPLICATIONS

This application is a continuation application of prior U.S. patent application Ser. No. 12/637/067, filed Dec. 14, 2009 which is a continuation application of prior U.S. patent application Ser. No. 11/223,751, filed Sep. 9, 2005, now U.S. Pat. No. 7,636,089, each of which is hereby incorporated herein in its entirety by reference.

A portion of the disclosure of this patent document may contain material which is subject to copyright protection. The copyright owner has no objection to the facsimile reproduction by anyone of the patent document or the patent disclosure, as it collectively appears in the Patent and Trademark Office patent file or records, but otherwise reserves all copyright rights whatsoever.

BACKGROUND

Presenting a three-dimensional scene using a two-dimensional medium is well known in the art. One skilled in the art will know numerous techniques for presenting a three-dimensional scene using a two-dimensional medium, such as a computer screen or paper, e.g., linear perspective and projective geometry. The various techniques use matrices, e.g., homography matrices, and the relative positions of an image to transform images between the different perspective views. In addition, various techniques for generating shadows for the presentation of realistic three-dimensional graphics are also well known. Algorithms and methods for producing hard and soft shadows for rendering three-dimensional graphics are also well known.

A shortcoming exists in the art involving the presentation of a plurality of images for a user's review. Current methods of display include using thumbnails to display image files or data files with associated thumbnail images. Users may easily become bored of the generated display. For example, on a DVD, the chapter selection feature displays snapshots from a movie. The generated display is in a conventional grid-like format with no three-dimensional rendering.

There is a need in the art for a method and system for rendering a view of a plurality images on a two-dimensional display such that they appear to be in a three-dimensional space with three-dimensional graphical effects and animated transitions between views.

SUMMARY

The following represents a simplified summary of some embodiments of the invention in order to provide a basic understanding of various aspects of the invention. This summary is not an extensive overview of the invention. It is not intended to identify key or critical elements of the invention or to delineate the scope of the invention. Its sole purpose is to present some embodiments of the invention in simplified form as a prelude to the more detailed description that is presented below.

In accordance with aspects of the invention, a computer-implemented method of rendering at least one image to a user viewing a two-dimensional display such that the images appear to be positioned in a three-dimensional space is herein disclosed. The method includes steps of receiving an indication of a memory location, identifying and receiving images, determining a position on the display for the images, transforming the images, and rendering the images. A computer-readable medium comprising computer-readable instructions for performing the computer-implemented method described above is also envisioned.

In accordance with aspects of the invention, a computer system for rendering a plurality of images to a user viewing a two-dimensional visual display is also envisioned. The system may be comprised of a processing unit, visual display, memory unit, numerous module for performing various functions, and an input device.

DESCRIPTION OF THE DRAWINGS

The present invention is illustrated by way of example and not limited in the accompanying figures in which like reference numerals indicate similar elements and in which.

In accordance with various aspects of the invention.

DETAILED DESCRIPTION

Figure 1:
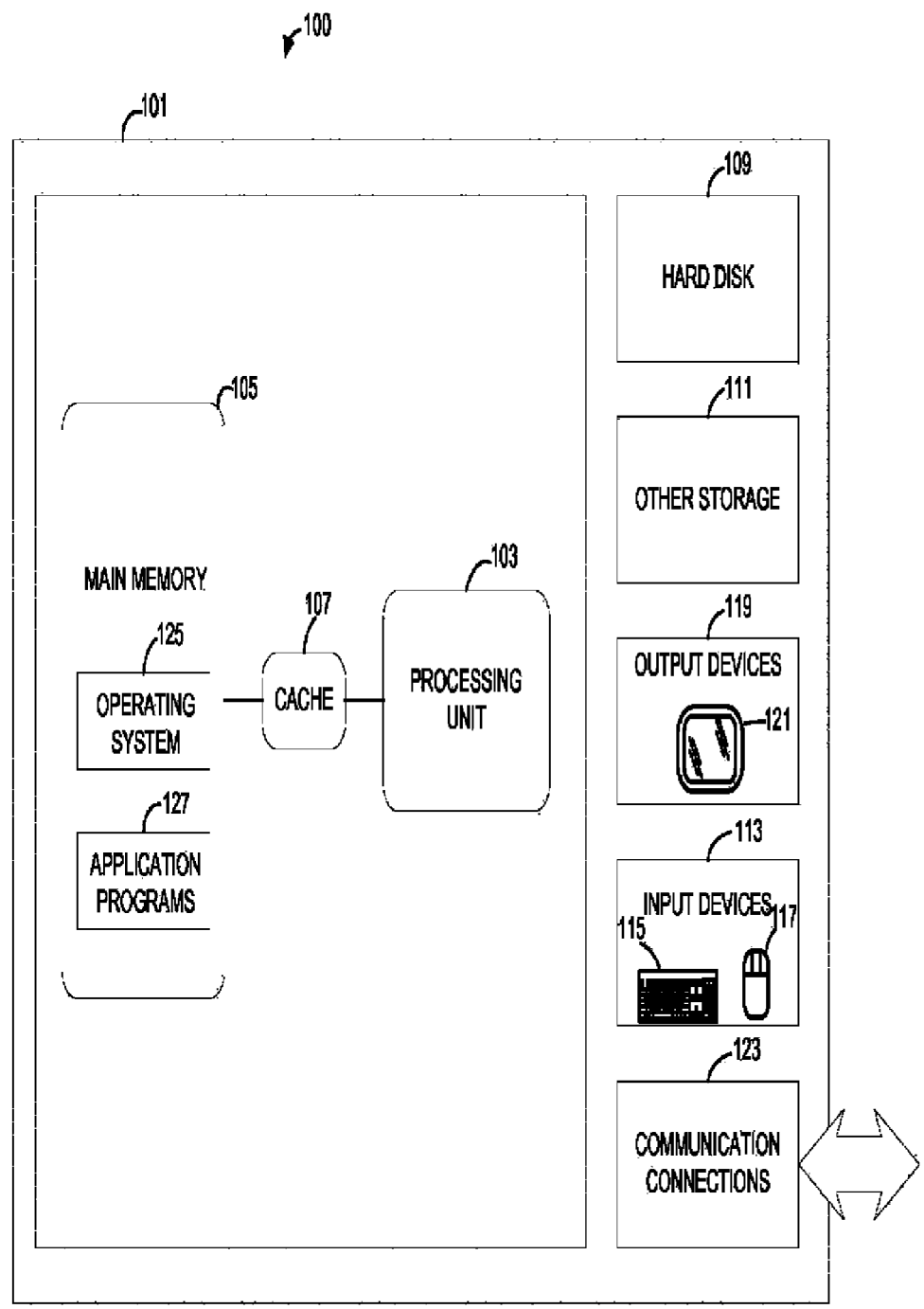
FIG. 1 is a depiction of an exemplary operating environment in accordance with various aspects of the invention.

An example of a suitable operating environment 100 in which various aspects of the invention may be implemented is shown in the highly simplified schematic diagram in FIG. 1. The features of such environments are well-known to those having skill in the art and need not be described at length here. The operating environment 100 is only one example of a suitable operating environment and is not intended to suggest any limitation as to the scope of use or functionality of the invention. Suitable computing environments for use with the invention include any computing device or computing system that supports interaction between user and machine.

With reference to FIG. 1, an illustrative system for implementing aspects of the invention includes a computing device, such as device 101. Device 101 commonly includes at least one processing unit 103 and memory unit (e.g., main memory 105, cache memory 107, etc.) connected to or situated within the processing unit 103 and serving as a buffer for the main memory 105. The memory unit may be comprised of one or more memories. Device 101 may have additional storage, including at least one magnetic hard disk 109 that serves as nonvolatile secondary storage and which is additionally used along with the main memory 105 in providing virtual memory. Device 101 may also have other storage 111, such as optical disks, removable magnetic disks, magnetic tape, and other removable and nonremovable computer-readable media capable of nonvolatile storage of program modules and data and accessible by device 101. Any such storage media may be part of device 101. To facilitate user-machine interaction, device 101 may have input devices 113 (e.g., keyboard 115, mouse 117, or other pointing devices), and output devices 119 (e.g., printer, plotter, portable handheld display screen, monitor, etc.). FIG. 1 illustrates a two-dimensional visual display screen 121 as an exemplary output device 119. Device 101 also typically includes one or more communication connections 123 that allow the device to communicate data with other devices.

Programs, comprising sets of instructions and associated data for the device 101, are commonly stored in the memory unit, from which they can be retrieved and executed by the processing unit 103. The processing unit 103 is capable of executing machine-readable instructions. Among the programs and program modules stored in the memory unit are those that comprise or are associated with an operating system 125 and with application programs 127. The device 101 has one or more systems of logical data storage, such as a file system or alternative systems using database-related techniques, associated with the operating system 125. Such systems of logical data storage serve as interfaces that map logically-organized data to data physically located on secondary storage media, such as data stored in clusters or sectors on the hard disk 109. In accordance with various embodiments of the invention, device 101 may be a handheld device or a conventional video player, e.g., a DVD player.

Computing device 101 includes forms of computer-readable media. Computer-readable media include any available media that can be accessed by the computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Figure 2:
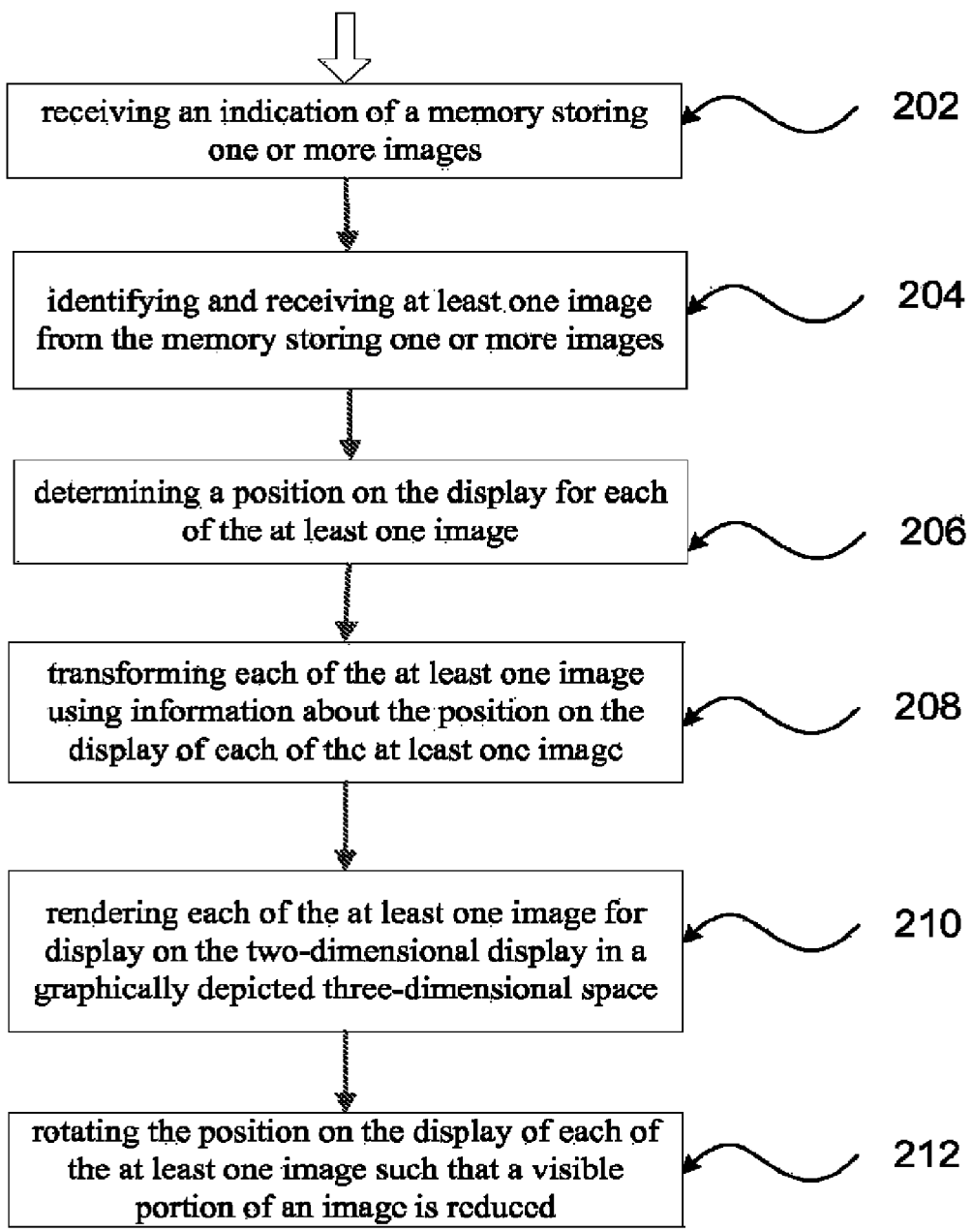
FIG. 2 is a flowchart diagramming a method of rendering images to a user in accordance with various aspects of the invention.

In accordance with various aspects of the invention, FIG. 2 illustrates a flowchart of a computer-implemented method for rendering at least one image to a user viewing a two-dimensional display 121. The images rendered appear to be positioned in a three-dimensional space when displayed on a two-dimensional display 121. Those skilled in the art will appreciate that the steps illustrated in FIG. 2 may be performed in other than the recited order, and that one or more steps illustrated in FIG. 2 may be optional. Further aspects of the invention are discussed in detail below.

In accordance with various aspects of the invention, step 202 includes receiving an indication of a memory storing one or more images. In one example, the indication is an identifier of a directory on a computer to which a user has navigated. In that particular case, step 202 may be performed in response to a user using a mouse 117 to click on a computer directory containing a plurality files. The one or more files may be graphic image files or standard files with an associated thumbnail image. For example, a Microsoft® Word document may have an image of the first page of that document saved as an associated thumbnail image. In another example, a standard image may appear for electronic files that do not have an appropriate associated thumbnail image. One example of a standard image may be a folder icon image. One of skill in the art will understand that an identifier of a directory includes, but is not limited to, an unique key to the directory folder or any pointer to a location in memory where the contents of a folder may be stored.

In accordance with various aspects of the invention, step 204 includes identifying and receiving at least one image from a memory storing one or more images. In some examples, the memory is comprised of at least a first image and a second image. The first and second image may be different (i.e., not identical.) A random selection module may be used to assist in the step of identifying an image from the memory. The random selection module results in a file from the directory of files being identified and received. As explained below, the received image is later displayed, for example, on a two-dimensional display 121.

Figure 5:
FIG. 5 is an illustration of a rendering of a first image and a second image for display on a two-dimensional display in accordance with various aspects of the invention.
Figure 6:
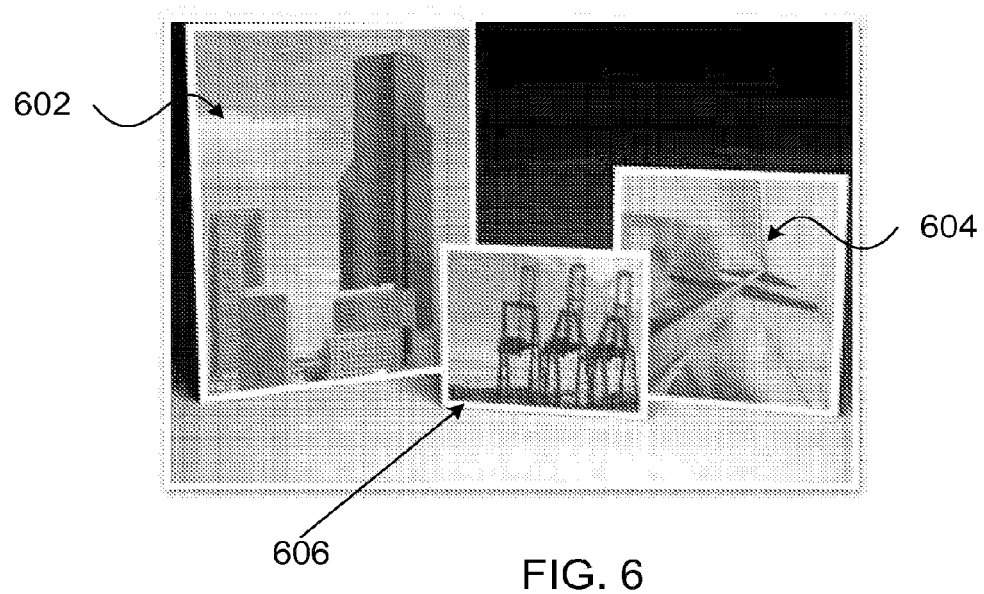
FIG. 6 is an illustration of a rendering of three randomly selected images for display in accordance with various aspects of the invention.

In addition, in step 206, a position on the display is determined for each of the images to be displayed. One skilled in the art will appreciate that there are numerous ways to layout a plurality of images on a display. For example, FIG. 5 is an illustrative view of two images on a two-dimensional display. Meanwhile, FIG. 6 is an illustrative view of three images on a two-dimensional display. Furthermore, illustrative views showing a single image, four images, and five or more images are also contemplated by the invention, although not illustrated. In addition, the position of an image on the display for each of the various layouts may be pre-determined. At least one advantage to this may be a savings in computation at the time of transforming and/or rendering.

In accordance with various aspects of the invention, step 208 includes transforming an image using information about the position of the image on the display. Transforming includes, but is not limited to, the operation of translating, skewing, scaling, and/or changing the orientation of an image. One skilled in the art will understand that various technique are conventionally used to transform images to make them appear three-dimensional.

In step 210, one or more images are rendered for display on the two-dimensional display in a graphically depicted three-dimensional space. For example, in FIGS. 5 and 6, images are displayed in such a manner. In FIG. 5, a first image 502 and a second image 504 are displayed such that they appear to be positioned in a three-dimensional space, e.g., on a mantel piece. In FIG. 6, a plurality of images (602, 604, 606) are displayed in accordance with various aspects of the invention. Like image 502 in FIG. 5, image 602 in FIG. 6 is more prominent that the other images rendered for display to the user. While there are advantages to more prominently displaying an image than others, the invention is not so limited. Rather, in some examples, all or some of the images may be equally prominent.

Finally in step 212, the position on the display of the images is rotated such that the visible portion of an image is reduced. The visible portion of an image is the part of the image that is visible to a user. In various examples in accordance with the invention, the step of rotating the position of the image is performed in response to user navigation. For example, a user pressing the right arrow key on a keyboard 115 may eventually result in the moving of the positions of the images on the display 119. In another example, a user may navigate a pointer of a mouse 117 in a given direction to eventually cause the positions of the images on the display to be rotated. In some examples, the rotating may be delayed by a pre-determined amount of time. At least one advantage of a delay feature is that it allows a user to enjoy the visible transition from one perspective view to another.

Figure 7:
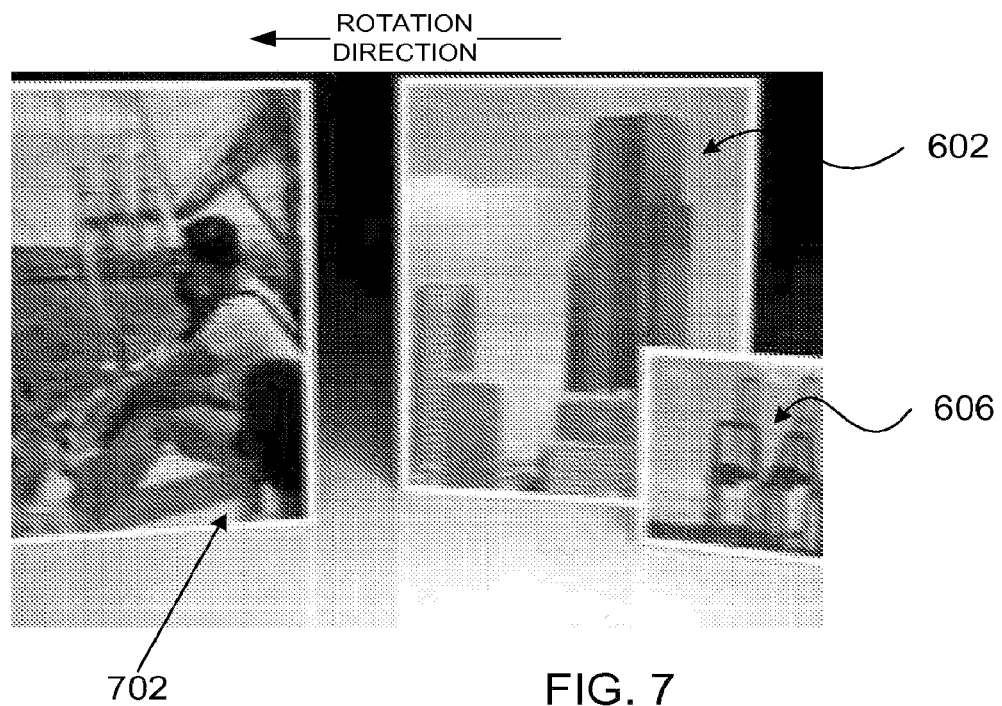
FIG. 7 is an illustration of a step of rotating the position of images on the two-dimensional display.

For example, referring to FIG. 7, image 702 is an image from a prior display in accordance with the invention. Meanwhile, image 602 and image 606 in FIG. 7 are images from a new display in accordance with the invention. FIG. 7 illustrates the position of images in rotation such that a visible portion of an image is reduced. In the example depicted in FIG. 7, the visible portion of image 702 is reduced. Meanwhile, the visible portion of image 602 and image 606 are increased. The final display after the rotation is complete is illustrated in FIG. 6, which shows images 602, 604, and 606 displayed on the screen.

In accordance with various aspects of the invention, step 212 may also include the step of transforming the images. In continuing the prior example relating to FIG. 7, the transition animation also includes transforming the displayed images such that they appear to be displayed in a three-dimensional space. In particular, an illustrative view of the images is such that the images appear to be placed along the perimeter of a substantially circular space while the user's view is from the perspective of a fixed position at or near the center of the space. In other words, the images appear to the user such that the user is viewing the images from a fixed position at the center of a three-dimensional substantially circular space. Thus, the images are transformed as they are rotated.

Figure 3:
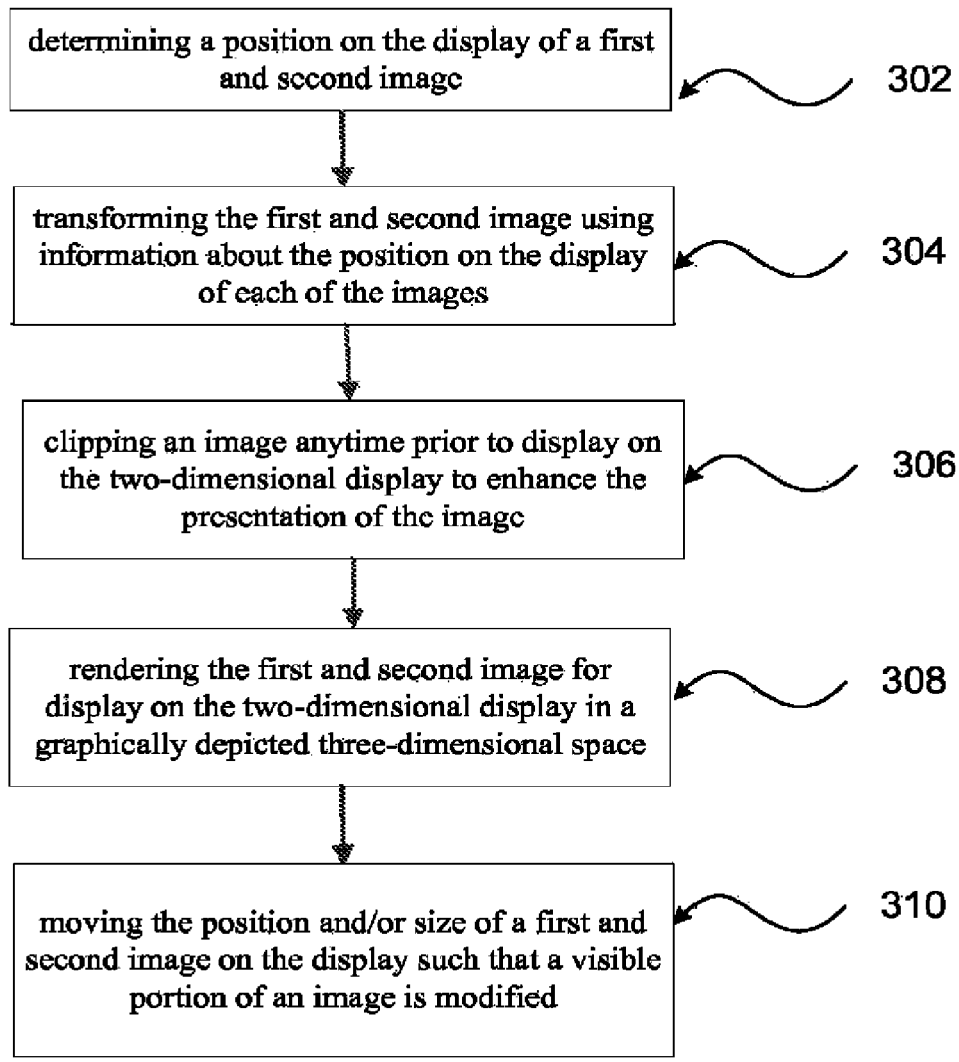
FIG. 3 is another flowchart diagramming a method of rendering images to a user in accordance with various aspects of the invention.

Referring now to the illustrative flowchart in FIG. 3, one skilled in the art will appreciate that the illustrated steps may be performed in other than the recited order, and that one or more illustrated steps may be optional. FIG. 3 illustrates a flowchart of a computer-implemented method for rendering a plurality of images to a user viewing a two-dimensional display 121. The images rendered appear to be positioned in a three-dimensional space when displayed on a two-dimensional display 121. Like step 206, in step 302, a first and second images' position on the display is determined. In step 304, like in step 208, information about a first and second images' position on the display is used to transform the images. Anytime prior to display, in step 306, the image is clipped to enhance the presentation of the image in accordance with various aspects of the invention. One skilled in the art will understand that the operation of clipping includes, but is not limited to, the cutting out of segments of an image. Clipping may be beneficial for a number of reasons: clipping reduces memory usage and may increase efficiency.

In accordance with various aspects of the invention, in step 308, a first image and a second image are rendered for display such that they appear to be positioned in a three-dimensional space. One skilled in the art will recognize that step 308 is similar to step 210 from FIG. 2. Moreover, in step 308, a three-dimensional graphical effect may be rendered for display. Examples of three-dimensional graphical effects include, but are not limited to, reflections, shadows, and decorative graphical effects. For example, in FIG. 5, a reflection of image 502 and image 504 is visible below the actual image in the figure. Also, a shadow of image 606 is visible on the left side of that image. In addition, a decorative graphical effect is visible around the perimeter of images 502 and 504. The white border (i.e., photo frame) around images 502 and 504 is an example of a decorative graphical effect. Rather, decorative graphical effects include, but are not limited to, the photo frame effect of the white border, background, and flooring. At least one benefit of step 308 is the enhanced presentation of the first and second images that results.

Finally, in step 310, the position and/or size of a first and second image on the display are moved such that a visible portion of an image is modified. For example, referring to FIG. 7, image 702 is an image from a prior display, while images 602 and 606 are from a new display in accordance with the invention. In the example depicted in FIG. 7, the visible portion of image 702 is reduced. Meanwhile, the visible portions of image 602 and image 606 are increased. The position of image 602 and image 606 on the screen is moved to the left. One skilled in the art will understand that the positions of images may be moved in other directions in accordance with the invention.

Figure 8:
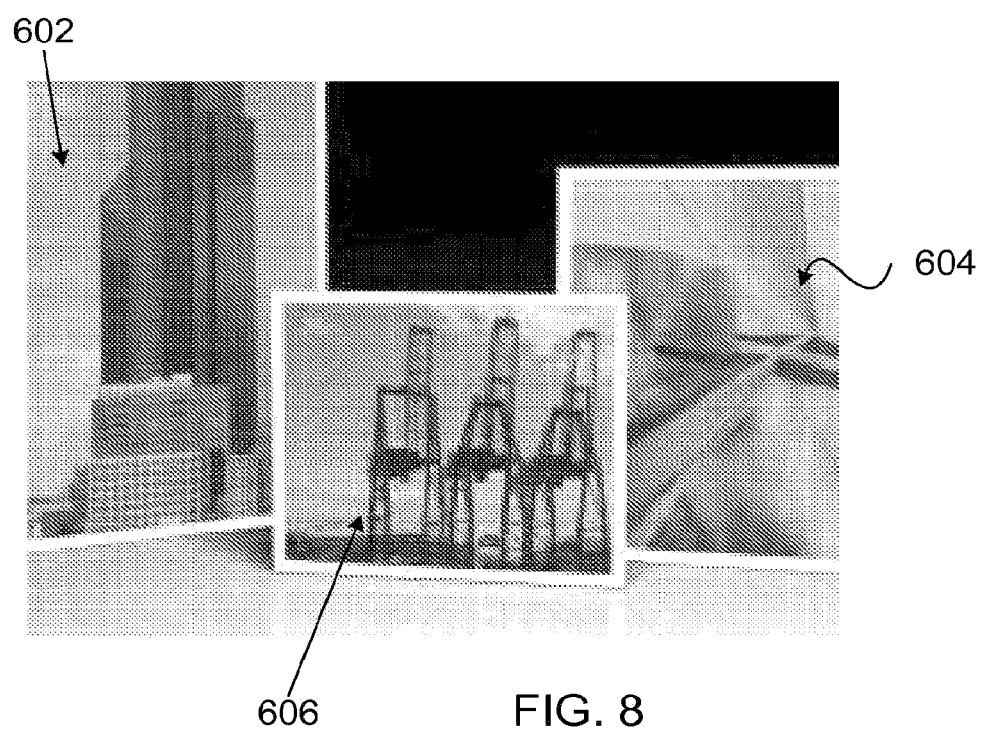
FIG. 8 is an illustration of a step of modifying the size of an image in accordance with various aspects of the invention.

Furthermore, the size of an image may be modified in step 310. In some examples, step 310 may be performed in response to user input. Assuming the images are selectable, one way a user may provide user input is by selecting an image using a mouse 117. Referring to FIG. 8, a user selecting image 606 results in the display being zoomed in to image 606. In FIG. 8, image 606 is larger than the same image depicted in FIG. 6. Also, the visible portions of images 602 and 604 in FIG. 8 are reduced.

Figure 4:
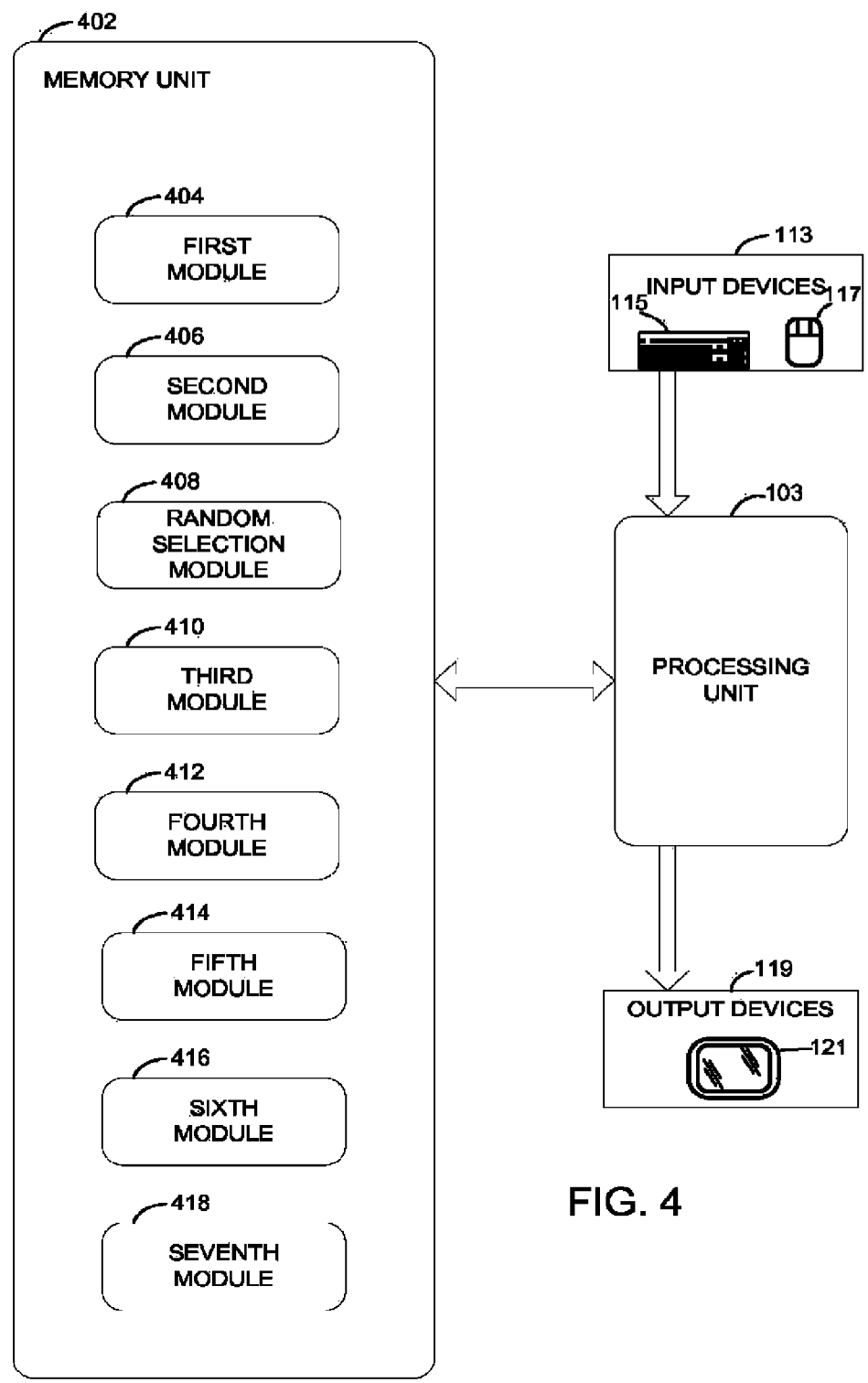
FIG. 4 is an exemplary diagram of a computer system for rendering images to a user in accordance with various aspects of the invention.

Referring to FIG. 4, a system for rendering at least one image to a user viewing a two-dimensional display 121 is illustrated. In accordance with various aspects of the invention, the images are rendered to appear to be positioned in a three-dimensional space when displayed. A system in accordance with the invention may be comprised of the following: a processing unit 103 capable of executing instructions readable by a machine; a two-dimensional visual display 121 for displaying a plurality of images; an input device 113 capable of allowing a user to select an image; a memory unit 402 comprising the images and the machine-readable commands for execution by the processing unit 103; and numerous modules (404 to 418) of machine-readable instruction for execution by the processing unit.

For example, a DVD player containing the aforementioned components of the system may behave in accordance with the invention. Various aspects of the invention were discussed in detail earlier. The first module 404 may be performed in response to a user selecting a menu option on a DVD. The first module 404 receives an indication of a plurality of images stored in the memory unit. The second module 406 identifies and receives a first image and a second image from the plurality of images stored in the memory unit 402. The second module 406 is assisted by the random selection module 408, as explained earlier. The third module 410 determines a first position on the visual display for the first image and a second position on the visual display for the second image. The fourth module 412 transforms the first image with information about the first position and the second image with information about the second position on the visual display. The fifth module 414 renders the first image and second image for display such that the first image and second image appear to be positioned in a three-dimensional space. The sixth module 416 renders three-dimensional graphical effects for display on the two-dimensional display to enhance the presentation of the first image and second image. The seventh module 418 moves the position of the first image on the display and the position of the second image on the display such that in response to user input a visible portion of the first image is reduced. One skilled in the art will understand that the function of one or more modules may be combined into a single component without necessarily teaching away from the invention contemplated by the disclosure.

After through review of the entire disclosure, it will become apparent to one skilled in the art that there are numerous practical applications for various aspects of the invention. For example, a computer-readable medium containing computer-executable instructions for performing the method diagrammed in the flowcharts of FIGS. 2 and 3 is contemplated by the aforementioned disclosure. The usefulness of the invention in such a context is apparent to one skilled in the art. Finally, aspects of the invention may be beneficial anywhere there is a need to display multiple images simultaneously for a user's review, e.g., in a thumbnail view. Finally, one skilled in the art will recognize that aspects of the invention may be advantageous in applications outside of computers, e.g., in a DVD player.

The use of the terms "a," "an" and "the" and similar referents in the context of describing the invention, especially in the context of the following claims, is to be construed to cover both the singular and the plural, unless otherwise indicated herein or clearly contradicted by context. The terms "comprising," "having," "including," and "containing" are to be construed as open-ended terms (meaning "including, but not limited to,") unless otherwise noted. The use of any and all examples or exemplary language herein (e.g., "such as") is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations on those preferred embodiments may become apparent to those having ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The present invention has sometimes been described in terms of preferred and illustrative embodiments thereof. Numerous other embodiments, modifications and variations within the scope and spirit of the appended claims will occur to persons of ordinary skill in the art from a review of this disclosure.

The invention claimed is:

1. One or more computer-readable storage media having computer-executable instructions embodied thereon that, when executed, perform a method for rendering a plurality of graphical images to a user viewing a two-dimensional display, wherein the plurality of graphical images appear to be positioned in a three-dimensional space when displayed on the two-dimensional display, the method comprising:
   receiving a selection of a directory in a computer memory containing a plurality of files, each file having an associated graphical image, and the selection indicating a request to view the associated graphical images of the plurality of files:
   retrieving a first graphical image and a second graphical image from the plurality of graphical images stored in the memory;
   determining a first position on a visual display for the first graphical image and a second position on the visual display for the second graphical image;
   transforming the first graphical image based on information about the first position and the second graphical image based on information about the second position on the visual display;
   rendering the first graphical image and second graphical image for display in a graphically depicted three-dimensional space;
   receiving a user navigation input instructing movement of the first graphical image to a third position and movement of the second graphical image to a fourth position, wherein the third and fourth positions are the same or different than the first and second positions;
   transforming the first and second graphical images with information about the third and fourth positions respectively to change the orientation of the first and second graphical images in the graphically depicted three-dimensional space; and
   rendering the first and second graphical images for display in the graphically depicted three-dimensional space in the third and fourth positions respectively.

2. The storage media of claim 1, wherein the two-dimensional display comprises a left portion, a right portion, and a center, and wherein the information about the first, second, third, and fourth positions includes an indication describing the positing as being in the left portion, the right portion, or the center.

3. The storage media of claim 2, wherein transforming the first and second graphical images based on information about the first, second, third, and fourth positions includes changing the orientation of the first and second graphical images such that the first and second graphical images appear to be rotated into the graphically depicted three-dimensional space when the first, second, third, or fourth positions are in the left portion or right portion.

4. The storage media of claim 3, wherein transforming the first and second graphical images based on information about the first, second, third, and fourth positions includes changing the orientation of the first and second graphical images such that the first and second graphical images appear generally flat in the graphically depicted three-dimensional space when the first, second, third, or fourth positions are in the center.

5. The storage media of claim 3, wherein a right side of the first and second graphical images is rotated into the graphically depicted three-dimensional space when the first, second, third, or fourth positions are in the left portion, and wherein a left side of the first and second graphical images is rotated into the graphically depicted three-dimensional space when the first, second, third, or fourth positions are in the right portion.

6. The storage media of claim 3, wherein the first and second graphical images overlap when both the first and second graphical images are in the left portion or when both the first and second graphical images are in the right portion.

7. The storage media of claim 1, wherein rendering the first and second graphical images in the third and fourth positions is delayed a predetermined amount of time.

8. The storage media of claim 7, wherein the predetermined amount of time is sufficient to display a transition animation of a movement of the first and second graphical images from the first and second positions to the third and fourth positions, respectively.

9. The storage media of claim 1, wherein the navigation input is a touch input.

10. The storage media of claim 1, further comprising:
   rendering three-dimensional graphical effects for display on the two-dimensional display to enhance the presentation of the first and second graphical images.

11. The storage media of claim 10, wherein the three-dimensional graphical effects include a reflection of the first and second graphical images.

12. The storage media of claim 11, wherein the reflection is depicted on a virtual flooring depicted beneath the first and second graphical images within the graphically depicted three-dimensional space.

13. A computer system for representing a directory's contents by rendering a plurality of graphical images representing the contents on a two-dimensional display with the appearance of being positioned in a three-dimensional space, the system comprising:

a processing unit capable of executing machine-readable instructions;

a two-dimensional visual display for displaying the plurality of graphical images and including a left portion, a right portion, and a center between the left and right portions;

one or more memories containing the plurality of graphical images and machine-readable instructions that, when executed by the processor, perform steps comprising:

receiving an indication of a plurality of graphical images stored in one or more of the memories, identifying and receiving a first graphical image and a second graphical image from the plurality of images stored in the one or more of the memories, determining a first position on the visual display for the first graphical image and a second position on the visual display for the second graphical image, wherein the first and second positions are each located in one of the left portion, right portion, or center of the two-dimensional visual display, transforming the first graphical image with information about the first position and the second graphical image with information about the second position on the visual display, the information about the first position indicating a location at the center and information about the second position indicates a location within the left portion or right portion, rendering the first graphical image and second graphical image for display in a graphically depicted three-dimensional space, and in response to user input, moving the position of the first and second graphical images on the display such that a visible portion of the first graphical image is reduced and the second graphical image is moved to the first position; and an input device for the user to provide an indication to move the first and second graphical images in the graphically depicted three-dimensional space.

14. The system of claim 13, wherein the input device is a touch input device.

15. The system of claim 13, wherein the one or more memories containing the plurality of graphical images and machine-readable instructions that, when executed by the processor, perform steps that further comprise:

rendering three-dimensional graphical effects for display on the two-dimensional display to enhance the presentation of the first graphical image and second graphical image.

16. A computer-implemented method for displaying the contents of a computer directory by rendering a plurality of graphical images on a two-dimensional display with the appearance of being positioned in a three-dimensional space, the method comprising:

identifying via a computing device having a processor, a directory that includes a plurality of files and a representative image of each of the plurality of files stored in a memory, the contents of the directory to be presented on a visual display associated with the computing device;

determining a first position on the visual display for a first representative image for a first file from the plurality of files and a second position on the visual display for a second representative image for a second file from the plurality of files;

transforming the first representative image based on information about the first position and the second representative image based on information about the second position, the information including an indication of a location in a left portion, a right portion, or a center between the left and right portions on the visual display, and wherein transforming the first and second representative images includes rotating the first and second representative images with respect to the location of the first and second positions, respectively;

presenting the first and second representative images in a graphically depicted three-dimensional space on the visual display;

receiving a navigation input instructing movement of the first representative image to a third position and movement of the second representative image to the first position;

transforming the first and second representative images based on information about the third and first positions, respectively, to change the orientation of the first and second representative images in the graphically depicted three-dimensional space with respect to a location of the third and first positions on the visual display, respectively;

providing a delay comprising an amount of time sufficient to present a transition animation depicting movement of the first and second representative images from the first and second positions to the third and first positions, respectively; and presenting the first and second representative images in the third and first positions, respectively.

17. The method of claim 16, wherein when the first and second positions are both in the left portion or both in the right portion of the visual display the first and second representative images are equally rotated and overlap.

18. The method of claim 16, wherein when the first position is in the central portion of the visual display the first representative image is substantially un-rotated and is more prominently displayed than the second representative image.

19. The method of claim 16, wherein the first position is in the left portion of the visual display and a right side of the first representative image is rotated into the graphically depicted three dimensional space about an axis generally along a left side of the first representative image or the first position is in the right portion of the visual display and the and a left side of the first representative image is rotated into the graphically depicted three dimensional space about an axis generally along a right side of the first representative image.

20. The method of claim 16, further comprising:

rendering three-dimensional graphical effects for display on the two dimensional display to enhance the presentation of the first representative image and second representative image, the three-dimensional graphical effects including a reflection of the first and second representative images on a virtual flooring in the three-dimensional space.

* * * * *